United States Patent Office 2,777,845
Patented Jan. 15, 1957

---

2,777,845

DYES PREPARED FROM DIALDEHYDES BY CONDENSING WITH HOMOPHTHALIC ACID AND WITH N-SUBSTITUTED OXINDOLES

Aaron Oken, Newark, Del., and Herman E. Schroeder, Kennett Square, Pa., assignors to E. I. du Pont de Nemours and Company, Wilmington, Del., a corporation of Delaware No Drawing. Application December 8, 1955,
Serial No. 551,740

3 Claims. (Cl. 260—240)

This invention sets forth a novel approach to the formation of a series of dispersed dyes and dye intermediates, said approach starting with homophthalic acid and oxindoles.

The inventors faced the problem of discovering new approaches to the development of dye chromophores having potential value in the manufacture of low-cost dyes and dye intermediates.

In general, the reaction of aldehydes with active methylene groups is well known. The starting materials for Examples 1–3 in the present specification are old. Homophthalic acid is described in Beilstein IX–857. The other starting materials are known as is evidenced by references set forth in the examples.

It is an object of this invention to produce dispersed dyes which may be used in the dyeing of cellulose acetate and other synthetic fibers. It is a further object of this invention to produce dye intermediates for the formation of said dispersed dyes which may be applied to cotton from an alkali hydrosulfite vat.

The compounds of the present invention have the following structure:

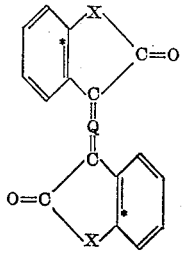

where X represents

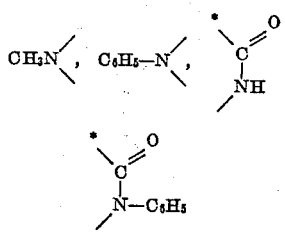

and

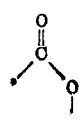

Q represents

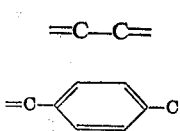

the asterisks indicate the common point of attachment for the X substituents.

Glyoxal sulfate and terephthalaldehyde are shown in certain combinations in examples which follow; however, these dialdehydes can be used in each and every example set forth:

*Example 1*

Preparation of:

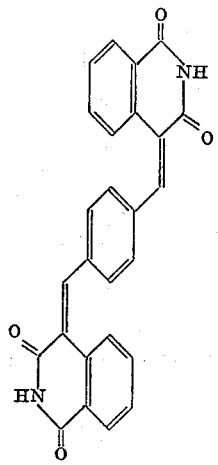

A mixture of 33 parts of homophthalimide (Beilstein XXI, page 176), 13.5 parts of terephthalaldehyde and 200 parts of N-dimethylformamide was heated for 8 hours at 130–140° C. The cool solution was diluted with ethanol and filtered to give 26 parts of bright yellow solid.

*Example 2*

Preparation of

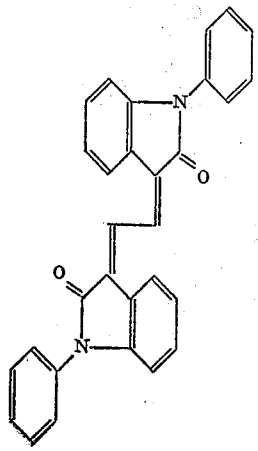

A mixture of N-phenyloxindole (made from diphenylamine and chloroacetyl chloride by known methods, Stollé, Ber. 47, 2120) (2.1 parts), glyoxal sulfate (0.95 part) and 10 parts N-dimethylformamide was heated at 135° C. for 10 minutes, cooled to 80° C. and filtered to give 1.1 parts of violet-red solid melting at 306–310° C., which contained 6.53% nitrogen.

When an equivalent amount of N-methyloxindole is substituted for the N-phenyloxindole in this example a similar compound is obtained.

*Example 3*

Preparation of:

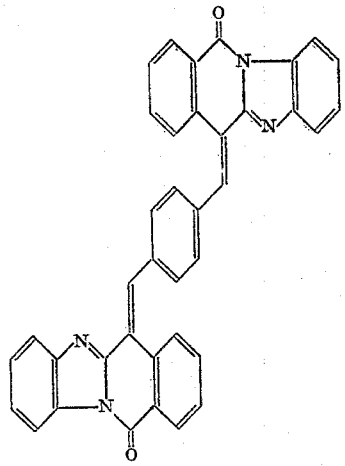

A mixture of 7 parts of terephthalaldehyde, 24 parts of benzimidazoisoquinolone (obtained from homophthalic acid and o-phenylenediamine by the method described by Bistrzycki and Fassler, Helv. Chim. Acta, vol. 6, page 526 (1923)) and 150 parts of N-dimethylformamide was heated at 120–130° C. for 2 hours. Filtering and washing with ethanol gave 19 parts of a reddish-orange solid which contained 8.9% nitrogen and dissolved in concentrated sulfuric acid with a red color; this dye does not vat when treated with alkaline hydrosulfite.

*Example 4*

Preparation of:

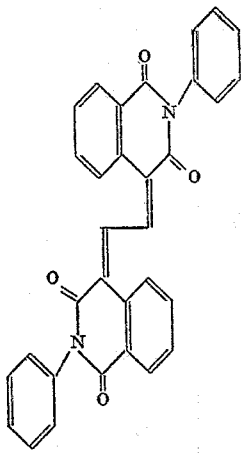

A mixture of 3 parts of N-phenylhomophthalimide, 1.5 parts of glyoxal sulfate and 10 parts N-dimethylformamide was warmed slightly. The reagents dissolved to give a dark solution from which deeply colored orange crystals gradually deposited. After 3 hours, the mixture was filtered and the product was washed with ethanol to give 1 part of an orange solid. This material contains 5.71% nitrogen and dissolves in concentrated sulfuric acid with a red color.

*Example 5*

Preparation of:

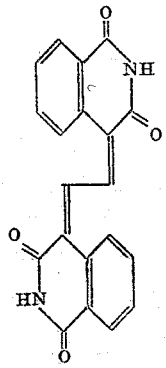

A mixture of 16 parts of homophthalimide, 12 parts of glyoxal sulfate and 50 parts of N-dimethylformamide was held at 70–80° C. for one-half hour, and then filtered. An orange crystalline product (4 parts) was obtained which gives a red alkaline-hydrosulfite vat and dyes cotton in yellow shades.

The same product can be prepared by heating a mixture of 16 parts of homophthalimide, 10 parts of 30% aqueous glyoxal and 50 parts of N-dimethylformamide for one-half hour at 100–110° C. The orange product amounts to 15 parts and contains 8.15% nitrogen.

*Example 6*

Preparation of:

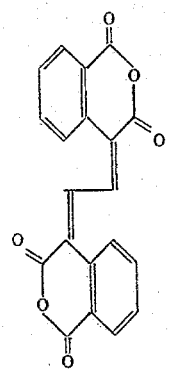

A mixture of 18 parts of homophthalic acid, 12.5 parts of glyoxal sulfate and 50 parts of N-dimethylformamide was warmed at 50–80° C. for 1 hour. Filtering and washing with ethanol gave 5 parts of an orange solid. This product does not dissolve in dilute alkali at room temperature but does vat in aqueous sodium hydrosulfite to an unstable orange solution which rapidly changes to a colorless solution. The compound melts at about 290° C.

We claim:
1. The compound

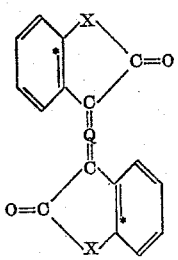

wherein X is taken from the group consisting of

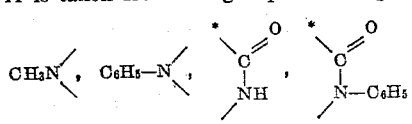

and
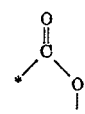
Q is taken from the group consisting of =C—C= and
and, the asterisks indicate the common point of attachment for the X substituents.
2. The compound
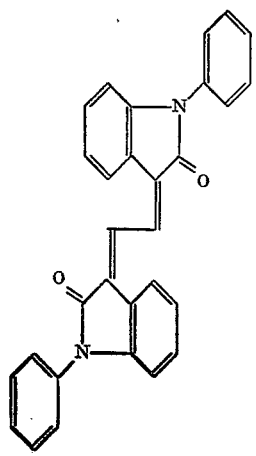
3. The compound
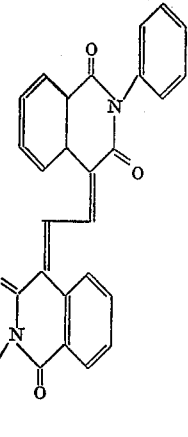
References Cited in the file of this patent
Hasselstrom: Chem. Abstracts, vol. 25, p. 4880 (1931).
Ostrogovich et al.: Chem. Abstracts, vol. 32, col. 498 (1938).